(12) United States Patent
Kleymenov et al.

(10) Patent No.: US 12,341,787 B2
(45) Date of Patent: Jun. 24, 2025

(54) METHOD FOR AUTOMATIC SIGNATURES GENERATION FROM A PLURALITY OF SOURCES

(71) Applicant: Nozomi Networks Sagl, Mendrisio (CH)

(72) Inventors: Alexey Kleymenov, Massagno (CH); Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 493 days.

(21) Appl. No.: 17/855,940

(22) Filed: Jul. 1, 2022

(65) Prior Publication Data

US 2024/0007483 A1  Jan. 4, 2024

(51) Int. Cl.
*H04L 9/40* (2022.01)
*H04L 9/32* (2006.01)

(52) U.S. Cl.
CPC ........ *H04L 63/1416* (2013.01); *H04L 9/3247* (2013.01)

(58) Field of Classification Search
CPC ............. H04L 63/1416; H04L 63/1408; H04L 9/3247
See application file for complete search history.

(56) References Cited

U.S. PATENT DOCUMENTS

2015/0326588 A1* 11/2015 Vissamsetty ........ H04L 63/1491 726/23
2016/0342477 A1* 11/2016 Swierk .................. G06F 9/4406
(Continued)

FOREIGN PATENT DOCUMENTS

WO  2017184189 A1  10/2017
WO  2018125903 A1  7/2018

OTHER PUBLICATIONS

Ivo Vacas et al., Detecting Network Threats using OSINT Knowledge-based IDS, IEEE (Year: 2018).*
(Continued)

*Primary Examiner* — Shanto Abedin
(74) *Attorney, Agent, or Firm* — Jason L DeFrancesco

(57) ABSTRACT

The present invention relates to a method for automatic signatures generation from a plurality of sources, comprising defining a plurality of identified sources of samples providers, collecting, by a computerized data processing unit, input samples from the sample providers, verifying, by the computerized data processing unit, the input samples defining verified input samples, generating, by the computerized data processing unit, verified signatures from the verified input samples, storing, in a verified signatures database operatively connected to the computerized data processing unit, the verified signatures, wherein the collecting comprises extracting raw IoCs from the input samples, wherein the verifying comprises evaluating the reputation of each of the raw IoCs according to predefined reputation rules and comparing each of the raw IoCs with a database of existing signatures operatively connected to the data processing unit to define allowable raw IoCs; and wherein the generating comprises creating the verified signatures from the verified input samples corresponding to the allowable raw IoCs.

9 Claims, 1 Drawing Sheet

(56) References Cited

U.S. PATENT DOCUMENTS

| | | | |
|---|---|---|---|
| 2017/0118245 A1* | 4/2017 | Tcherchian | H04L 63/1416 |
| 2018/0063163 A1* | 3/2018 | Pevny | H04L 63/1425 |
| 2018/0191747 A1* | 7/2018 | Nachenberg | H04L 63/1416 |
| 2019/0121977 A1 | 4/2019 | Gordeychik et al. | |
| 2020/0382525 A1* | 12/2020 | Scheideler | H04L 63/1416 |
| 2021/0144178 A1* | 5/2021 | Bailey | H04L 63/1433 |
| 2022/0417259 A1* | 12/2022 | Kulaga | H04L 63/1425 |

OTHER PUBLICATIONS

Lauren Rudman et al., A sharing platform for Indicators of Compromise, SATNAC (Year: 2016).*

Tounsi, W. and Rais, H., "A Survey on Technical Threat Intelligence: Research Trends & Challenges," Computers & Security, vol. 72, Jul. 2018, pp. 68-98, Elsevier Ltd., United Kingdom.

* cited by examiner

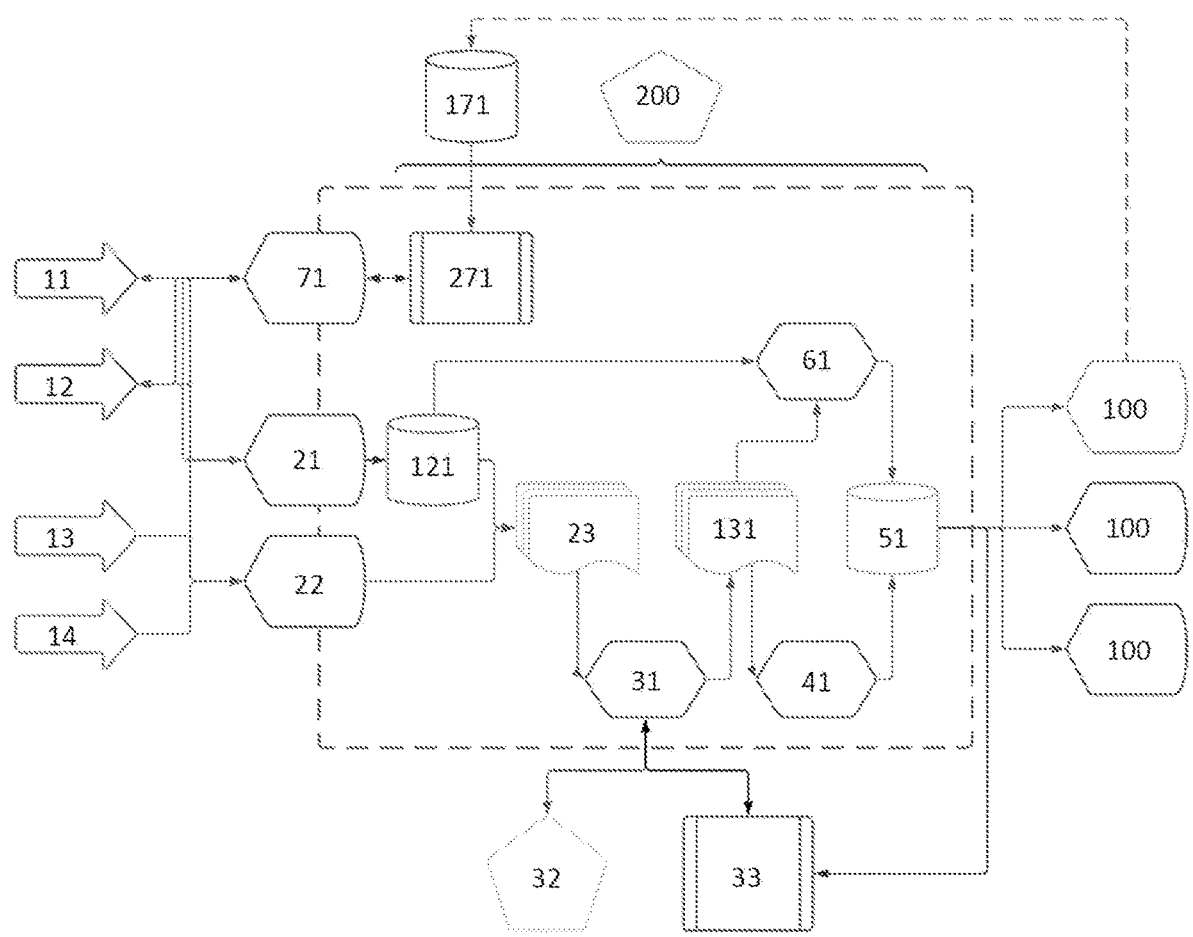

METHOD FOR AUTOMATIC SIGNATURES GENERATION FROM A PLURALITY OF SOURCES

FIELD OF INVENTION

The present invention relates to the field of security management of infrastructures, such as automation systems and industrial production systems.

In particular, the present invention relates to a method for automatic signatures generation from a plurality of sources.

BACKGROUND ART

Security products of known type detect malicious attacks and sometimes are also able to take action to prevent them. The majority of intrusion prevention systems utilize one of detection methods between signature-based, statistical anomaly-based, and stateful protocol analysis. Signature-based IDS monitors packets in the Network and compares with pre-configured and pre-determined attack patterns known as signatures. An IDS which is anomaly-based will monitor network traffic and compare it against an established baseline. The baseline will identify what is normal for that network. Finally, the stateful protocol analysis detection identifies deviations of protocol states by comparing observed events with pre-determined profiles of generally accepted definitions of benign activity.

Signatures (also simply known as "rules") are used in the first of the aforementioned methods, wherein each approach has advantages and disadvantages. Behavioral rules allow a device to be protected from new and previously unknown attacks. However, the coverage of behavioral systems is limited, many attacks aren't covered and the system generates many more false positives.

A signature is actually a fingerprint of a given attack. The signature captures the actions, which are unique to a given attack. This pragmatic approach is focused on specific attacks and is very accurate at lowering the rate of false positives.

Security products are commonly shipped with a periodically updated knowledge base of the patterns associated with malicious activity or insecure systems' states. These patterns are shipped as part of the so-called rules or signatures. Once the rule pattern matches the activity on the endpoint or network, the customer becomes aware of it in the form of some alert in order to take action.

An increasing number of rules is available on a daily basis, with multiple systems able to collect samples, preferably samples based on indicators of compromise ("IoCs"), such as network artifacts or file hashes, from multiple and different sources. Indicators of Compromise refer to artifacts or observables that suggest with high confidence the presence of malicious activity. Examples include IP addresses, domain names, file hashes, or registry keys associated with malware or threat actors.

It would therefore be desirable to issue automatic detections based on such samples.

BRIEF DESCRIPTION OF THE INVENTION

The object of the present invention is to provide a method for automatic signatures generation from a plurality of sources capable of minimizing the aforementioned drawbacks. In particular, it would be desirable to have a method capable to allow proactive automatic detections based on emerging threats.

According to the present invention is described, therefore, a method for automatic signatures generation from a plurality of sources, according to the appended claims.

The method comprises:
defining a plurality of identified sources of samples providers;
collecting, by a computerized data processing unit, input samples from the sample providers;
verifying, by the computerized data processing unit, the input samples defining verified input samples;
generating, by the computerized data processing unit, verified signatures from the verified input samples;
storing, in a verified signatures database operatively connected to the computerized data processing unit, the verified signatures;
wherein the collecting comprises extracting raw IoCs from the input samples;
wherein the verifying comprises evaluating the reputation of each of the raw IoCs according to predefined reputation rules and comparing each of the raw IoCs with a database of existing signatures operatively connected to the data processing unit to define allowable raw IoCs; and
wherein the generating comprises creating the verified signatures from said verified input samples corresponding to the allowable raw IoCs.

DESCRIPTION OF THE FIGURES

These and further features and advantages of the present invention will become apparent from the disclosure of the preferred embodiment, illustrated by way of a non-limiting example in the accompanying FIGURE, wherein:

FIG. 1 shows a block diagram of an apparatus carrying out the method for automatic signatures generation from a plurality of sources, according to the present invention.

DETAILED DESCRIPTION OF THE INVENTION

The present invention relates to a method for automatic signatures generation from a plurality of sources. In particular, the method according to the present invention found useful application in physical or IT infrastructures.

With the method of the present invention it is possible to collect samples, such as those comprising IoCs, which include but are not limited to IP addresses, URLs, domain names, file hashes, and other forensic evidence of potential intrusion, from multiple systems or sources. In this way it should be possible to issue automatic detections based on such collected sample and, eventually, check their status.

In an embodiment the input samples comprise input IoCs and input signatures, but different input samples can also be considered.

The identified sources of samples providers may comprise providers of automated inputs, as well as providers of manual introduced inputs. As such, in FIG. 1, the identified sources of samples providers comprise Crawlers for Open-Source Intelligence (OSINT), item 13, IoT honeypots, item 14, third parties supplying, as per item 12, or manual submissions, as per item 11.

The method according to the present invention comprises verifying 31, by the computerized data processing unit, the input samples defining verified input samples. In particular, the method accepts as input a plurality of input samples, either raw IoCs (network artifacts or file hashes) or existing signatures (raw signatures) from where raw IoCs can be extracted.

Further, the method comprises generating 41, by the computerized data processing unit, verified signatures from the verified input samples and then storing, in a verified signatures database 51 operatively connected to the computerized data processing unit, said verified signatures.

In particular, the collecting 22 comprises extracting 23 raw IoCs from the input samples. Moreover, the verifying 31 comprises evaluating the reputation 32 of each of the raw IoCs according to predefined reputation rules and comparing 33 each of the raw IoCs with a database of existing signatures operatively connected to the data processing unit to define allowable raw IoCs. Therefore, the raw IoCs are passed to external oracles to assure that the collected indicators are safe to be blocked and making sure there are no duplicates with existing collection of IoCs. A method for assessing the quality of network-related indicators of comprises can be used at this scope, such as the method described in the U.S. patent application Ser. No. 17/064,010 filed on Oct. 10, 2020 and published with n.US2022109688 A1, which is herewith incorporated by reference.

The allowable raw IoCs define a subset of verified IoCs 131 used to either generate new signatures or strip the provided ones, as described in greater details below.

In an embodiment, the generating 41 comprises creating the verified signatures from the verified input samples corresponding to the allowable raw IoCs. In an embodiment the verified signatures are of a STIX format, but supported signature format are not limited to STIX. The verified signatures are then created inserting the allowable raw IoCs into a predefined structure coupled with associated metadata. In this case, the process of generating signatures may involves putting the allowable raw IoC into a predefined structure (for example, XML or JSON in case of STIX) coupled with associated metadata that includes but not limited to the dates and times when it was made, the malware category and family involved, and the context and description of the corresponding threat.

Taking into account the starting from API IoCs 22 as input, the goal is to generate STIX signatures from raw IoCs. Only raw IoCs that are not present in the database of existing signatures and pass the predefined reputation rules will define allowable raw IoCs and are converted to verified signatures.

The input example of a raw IoC is:

```
curl -H "Content-Type: application/json" -d '{"<optional_filename>":
["aksdfjalsdkjf.com", "dfklajbdk.com", "example.com"]}'
'http://3.122.166.153:5000/input/iocs?source=ITHA'
```

The output example a verified signature based on the aforementioned raw IoC is:

```
[
  {
    "signature_id": "ecc4aa6c-c65e-41eb-aa13-ae68e4ce5902", "values": [
      {
        "description": "Malware submitted as part of ITHA feed",
        "source": "ITHA",
        "status": "success",
        "threat": "Trojan",
        "value": "aksdfjalsdkjf.com"
      },
      {
        "description": "Malware submitted as part of ITHA feed",
        "source": "ITHA",
        "status": "success",
        "threat": "Trojan",
        "value": "dfklajbdk.com"
      },
      {
        "description": "Malware submitted as part of ITHA feed",
        "source": "ITHA",
        "status": "excluded",
        "threat": "Trojan",
        "value": "example.com"
      }
    ]
  }
]
```

According to a further embodiment, the method for automatic signatures generation from a plurality of sources according to the present invention further comprise filtering 61 the input samples after collecting the same, wherein the collecting 21 comprises extracting 121 raw signatures from the input samples and wherein the filtering 61 comprises identifying the verified signatures from the raw signatures by removing the raw signatures comprising artifacts.

Therefore, the filtering 61 comprises the process of stripping raw signatures and involves removing parts associated with raw IoCs that are not able to pass the verification checks and therefore deemed as not safe to be used for protection purposes as they do not identify the threats with the high enough precision required. In particular, the raw signatures are received, the method runs reputation checks against the artifacts they contain to make the manual review easier and sends them to consumers.

The input example of a raw signature is:
curl-F 'file=@example.zip'
'http://3.122.166.153:5000/input/
    signatures?source=ITHA&sig_type=STIX'

The output example a verified signature based on the aforementioned raw signature is:

```
[{
  "status": "success",
  "signature_id": "ecc4aa6c-c65e-41eb-aa13-ae68e4ce5902"
}]
```

The result of all verified signatures, either from raw IoCs or from raw signatures, are stored in the verified signatures database 51 operatively connected to the computerized data processing unit.

The same verified signatures can then be sent to all the supported consumers for protection and to telemetry collection partners, collectively numbered as 100. Before releasing the verified signatures, it is also possible to consider the human analyst review (not shown).

As a result of the submission, the users of the method should receive information about the validated signatures in the form of their unique signature IDs. These IDs can be later used on the same method to search for hits of the corresponding signatures on customers' environments returned in the form of telemetry.

Therefore, in an embodiment, the method for automatic signatures generation from a plurality of sources according to the present invention further comprises receiving 71 telemetry data 171 with respect to said verified signatures. Preferably, method receives a list of signatures IDs 271 to collect telemetry for, runs queries against the telemetry and returns the results in JSON format.

The input example of a telemetry input is:
curl-H "Content-Type: application/json"-d '["9e067f24-b131-4    led-bf85-dab588fdca00"]'    'http://

3.122.166.153:5000/output/
telemetry?source=ITHA&from_date=2022-05-
01&to_date=2022-05-02'

A statistic visualization may also be operated, as illustrated in item 200 of FIG. 1.

The present invention should be implemented in the form of web APIs for better scalability.

The present invention therefore provides a method for automatic signatures generation from a plurality of sources capable of minimizing the aforementioned drawbacks. In particular, the present invention provides a method capable to allow high proactivity in protecting customers from emerging threats.

The invention claimed is:

1. A method for automatic signatures generation from a plurality of sources, comprising:
   defining a plurality of identified sources of samples providers;
   collecting, by a computerized data processing unit, input samples from said sample providers;
   extracting, by the computerized data processing unit, raw indicators of compromise (IoCs) from said input samples;
   verifying, by said computerized data processing unit, said input samples defining verified input samples;
   generating, by said computerized data processing unit, verified signatures from said verified input samples;
   storing, in a verified signatures database operatively connected to said computerized data processing unit, said verified signatures;
   wherein said collecting comprises extracting raw IoCs from said input samples;
   wherein said verifying comprises evaluating the reputation of each of said raw IoCs according to predefined reputation rules and comparing each of said raw IoCs with a database of existing signatures operatively connected to said data processing unit to define allowable raw IoCs; and
   wherein said generating comprises creating said verified signatures from said verified input samples corresponding to said allowable raw IoCs, by inserting each allowable raw IoC into a predefined structured format including associated metadata.

2. The method for automatic signatures generation from a plurality of sources according to claim 1, wherein said verified signatures are structured in a STIX format.

3. The method for automatic signatures generation from a plurality of sources according to claim 1, wherein said input samples comprises input IoCs and pre-existing threat detection signatures.

4. The method for automatic signatures generation from a plurality of sources according to claim 1, wherein said verified signatures are created by inserting said allowable raw IoCs into a predefined structure coupled with associated metadata.

5. The method for automatic signatures generation from a plurality of sources according to claim 4, wherein said predefined structure is an XML structure or a JSON structure.

6. The method for automatic signatures generation from a plurality of sources according to claim 4, wherein said metadata comprises information relating to one or more of: date of creation, time of creation, malware category.

7. The method for automatic signatures generation from a plurality of sources according to claim 1, wherein said method further comprises filtering said input samples after collecting said input samples;
   wherein said collecting comprises extracting raw signatures from said input samples; and
   wherein said filtering comprises identifying verified signatures by removing said raw signatures containing artifacts.

8. The method for automatic signatures generation from a plurality of sources according to claim 1, wherein said method further comprises receiving telemetry data related to usage or performance of said verified signatures.

9. The method of claim 1, wherein said raw indicators of compromise include one or more of: IP addresses, domain names, file hashes, email addresses, or URLs.

* * * * *